United States Patent
Katsuta (10) Patent No.: US 12,027,861 B2
(45) Date of Patent: Jul. 2, 2024

(54) ELECTRIC POWER SYSTEM

(71) Applicant: TOYOTA JIDOSHA KABUSHIKI KAISHA, Toyota (JP)

(72) Inventor: Hiroshi Katsuta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/118,521

(22) Filed: Mar. 7, 2023

(65) Prior Publication Data
US 2023/0318292 A1 Oct. 5, 2023

(30) Foreign Application Priority Data
Apr. 5, 2022 (JP) .................. 2022-062761

(51) Int. Cl.
*H02J 3/00* (2006.01)
(52) U.S. Cl.
CPC ........... *H02J 3/007* (2020.01); *H02J 2203/10* (2020.01); *H02J 2310/14* (2020.01); *H02J 2310/50* (2020.01)

(58) Field of Classification Search
CPC .... H02J 3/007; H02J 2310/14; H02J 2203/10; H02J 2310/50
See application file for complete search history.

(56) References Cited

U.S. PATENT DOCUMENTS 11,494,852 B2 * 11/2022 Madonna ........... G06Q 30/0283

FOREIGN PATENT DOCUMENTS

JP 2018-107981 A 7/2018

* cited by examiner

*Primary Examiner* — Carlos Amaya
(74) *Attorney, Agent, or Firm* — Oliff PLC (57) ABSTRACT

A server receives requests for power-on of electrical appliances provided in houses in an electricity distribution town block where an electricity distribution transformer is shared and arbitrates power-on timings of the electrical appliances provided in the houses to suppress simultaneous occurrence of an inrush current.

6 Claims, 4 Drawing Sheets

ELECTRIC POWER SYSTEM

This nonprovisional application is based on Japanese Patent Application No. 2022-062761 filed with the Japan Patent Office on Apr. 5, 2022, the entire contents of which are hereby incorporated by reference.

BACKGROUND

Field

The present disclosure relates to an electric power system.

Description of the Background Art

Japanese Patent Laying-Open No. 2018-107981 discloses an electricity distribution system capable of lowering a current (power flow) that flows through an electricity distribution line, achieving reduction in cost, and supplying electric power in a stable manner. In this electricity distribution system, a power interchange town block is formed from a plurality of stand-alone houses and a shared storage battery connected through the electricity distribution line to a pole-mounted transformer that down-converts electric power from a power grid (power network). Charging and discharging of the shared storage battery or the like is controlled such that a state of electric power through the electricity distribution line in the power interchange town block is accommodated in a prescribed state.

According to Japanese Patent Laying-Open No. 2018-107981, an amount of charging and discharging of the shared storage battery or the like is controlled such that a value of a current that flows through the electricity distribution line is equal to or smaller than a prescribed value, and thus the state of electric power through the electricity distribution line in the power interchange town block is accommodated in the prescribed state. The house is provided with various electrical appliances (electrical loads). Among such electrical loads, there is a load with a capacitive load or an inductive load, and an inrush current or a rush current is caused at the time of turn-on of power in the electrical load (power-on of the electrical load). The inrush current or the rush current may sometimes be ten or more times as high as a steady-state current, and may cause voltage lowering.

In particular, simultaneous occurrence of the inrush current or the rush current in the plurality of houses among which an electricity distribution transformer (pole-mounted transformer) is shared may result in great voltage lowering, and influence on the power grid may be unignorable. Furthermore, a current that flows through the electricity distribution transformer and the electricity distribution line becomes very high, which necessitates a facility large in allowable current value. Japanese Patent Laying-Open No. 2018-107981 is silent about such problems caused by the inrush current and the like.

SUMMARY

An object of the present disclosure is to suppress simultaneous occurrence of an inrush current or a rush current in a plurality of houses among which an electricity distribution transformer is shared, to suppress increase in voltage lowering, and to suppress a current that flows through an electricity distribution transformer and an electricity distribution becoming very high.

An electric power system according to the present disclosure includes a plurality of houses connected to an electricity distribution transformer that transforms electric power from a power grid, each of the plurality of houses including an electrical load accompanied by an inrush current or a rush current equal to or larger than a prescribed value in power-on, and a server that receives information on the electrical load. The electrical load included in the house is configured to issue a power-on request to request power-on of the electrical load and to be powered on based on a power-on permission command in response to the power-on request. The server is configured to arbitrate power-on timings of electrical loads included in the plurality of houses and to transmit the power-on permission command when the server simultaneously receives power-on requests from the electrical loads and when a parameter relating to voltage lowering due to the inrush current or the rush current is equal to or larger than an allowable value.

According to this configuration, the plurality of houses are connected to the electricity distribution transformer and share the electricity distribution transformer. The electrical load included in the house is configured to issue a power-on request that requests power-on accompanied by the inrush current or the rush current equal to or larger than a prescribed value and to be powered on based on the power-on permission command in response to the power-on request. When the server that can receive information on the electrical load simultaneously receives the power-on requests from the electrical loads included in the plurality of houses and when the parameter relating to voltage lowering due to the inrush current or the rush current is equal to or larger than the allowable value, the server arbitrates power-on timings of the electrical loads and transmit the power-on permission command.

When the server simultaneously receives the power-on requests from the electrical loads provided in the plurality of houses and when the parameter relating to voltage lowering due to the inrush current or the rush current is equal to or larger than the allowable value, the server arbitrates the power-on timings of the electrical loads. Therefore, simultaneous power-on of the electrical loads provided in the plurality of houses can be suppressed and simultaneous occurrence of the inrush current or the rush current can be suppressed.

Preferably, the parameter relating to voltage lowering may be an amount of electric power variation caused by the inrush current or the rush current. The server may be configured to find the amount of electric power variation for each of the electrical loads, to calculate a total amount of electric power variation by adding amounts of electric power variation of the electrical loads that have simultaneously issued the power-on requests, and to arbitrate power-on timings of the electrical loads and transmit the power-on permission command when the total amount of electric power variation is equal to or larger than the allowable value.

According to this configuration, voltage lowering caused by the inrush current or the rush current is estimated based on the amount of electric power variation caused by the inrush current or the rush current. An allowable level of voltage variation in the power grid (power network) is often determined by magnitude of the amount of electric power variation or magnitude of variation in frequency. In this configuration, since power-on timings of the electrical loads are arbitrated based on the amount of electric power variation due to the inrush current or the rush current, influence on the power grid can satisfactorily be suppressed.

Preferably, each house may include a controller that controls the electrical loads provided in that house. The controller is configured to communicate with the server, and the controller transmits the power-on request to the server and has the electrical load powered on based on the power-on permission command received from the server.

According to this configuration, the controller that can control the plurality of electrical loads provided in the house can transmit the power-on request to the server and have the electrical loads activated. Therefore, even when each electrical load and the server are not configured to communicate with each other, power-on timings of the electrical loads can be arbitrated.

Preferably, the electrical load may be configured to issue a turn-off request to request deactivation of the electrical load and to be deactivated based on a turn-off permission command in response to the turn-off request. The server is configured to arbitrate turn-off timings of the electrical loads included in the plurality of houses and to transmit the turn-off permission command when the server simultaneously receives turn-off requests from the electrical loads and when a parameter relating to voltage increase involved with the deactivation is equal to or larger than a threshold value.

When the electrical loads are simultaneously deactivated in the plurality of houses among which the electricity distribution transformer is shared, power consumption may abruptly lower and instantaneous voltage increase may occur. According to the configuration, the electrical load included in the house is configured to issue a turn-off request to request deactivation and to be deactivated based on the turn-off permission command in response to the turn-off request. When the server simultaneously receives the turn-off requests from the electrical loads included in the plurality of houses and when the parameter relating to voltage increase involved with deactivation is equal to or larger than the threshold value, the server arbitrates turn-off timings of the electrical loads and transmits the turn-off permission command.

When the server simultaneously receives the turn-off requests from the electrical loads provided in the plurality of houses and when the parameter relating to voltage increase involved with deactivation is equal to or larger than the threshold value, the server arbitrates turn-off timings of the electrical loads. Therefore, simultaneous turn-off of the electrical loads included in the plurality of houses can be prevented and instantaneous voltage increase can be suppressed.

Preferably, the parameter relating to voltage increase may be an amount of electric power variation caused by the deactivation. The server finds the amount of electric power variation for each electrical load, calculates a total amount of electric power variation by adding amounts of electric power variation of the electrical loads that have simultaneously issued turn-off requests, and arbitrates turn-off timings of the electrical loads and transmits the turn-off permission command when the total amount of electric power variation is equal to or larger than the threshold value.

The allowable level of voltage variation in the power grid (power network) is often determined by magnitude of the amount of electric power variation or magnitude of variation in frequency. According to this configuration, since voltage increase due to deactivation of the electrical load is estimated based on the amount of electric power variation and turn-off timings of the electrical loads are arbitrated, influence on the power grid can satisfactorily be suppressed.

Preferably, each house may include a controller that controls the electrical loads provided in that house. The controller is configured to communicate with the server, and the controller transmits the turn-off request to the server and has the electrical load deactivated based on the turn-off permission command received from the server.

According to this configuration, the controller that can control the plurality of electrical loads provided in the house can transmit the turn-off request to the server and have the electrical loads deactivated. Therefore, even when each electrical load and the server are not configured to communicate with each other, turn-off timings of the electrical loads can be arbitrated.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will be described in detail below with reference to the drawings. The same or corresponding elements in the drawings have the same reference characters allotted and description thereof will not be repeated.

Figure 1:
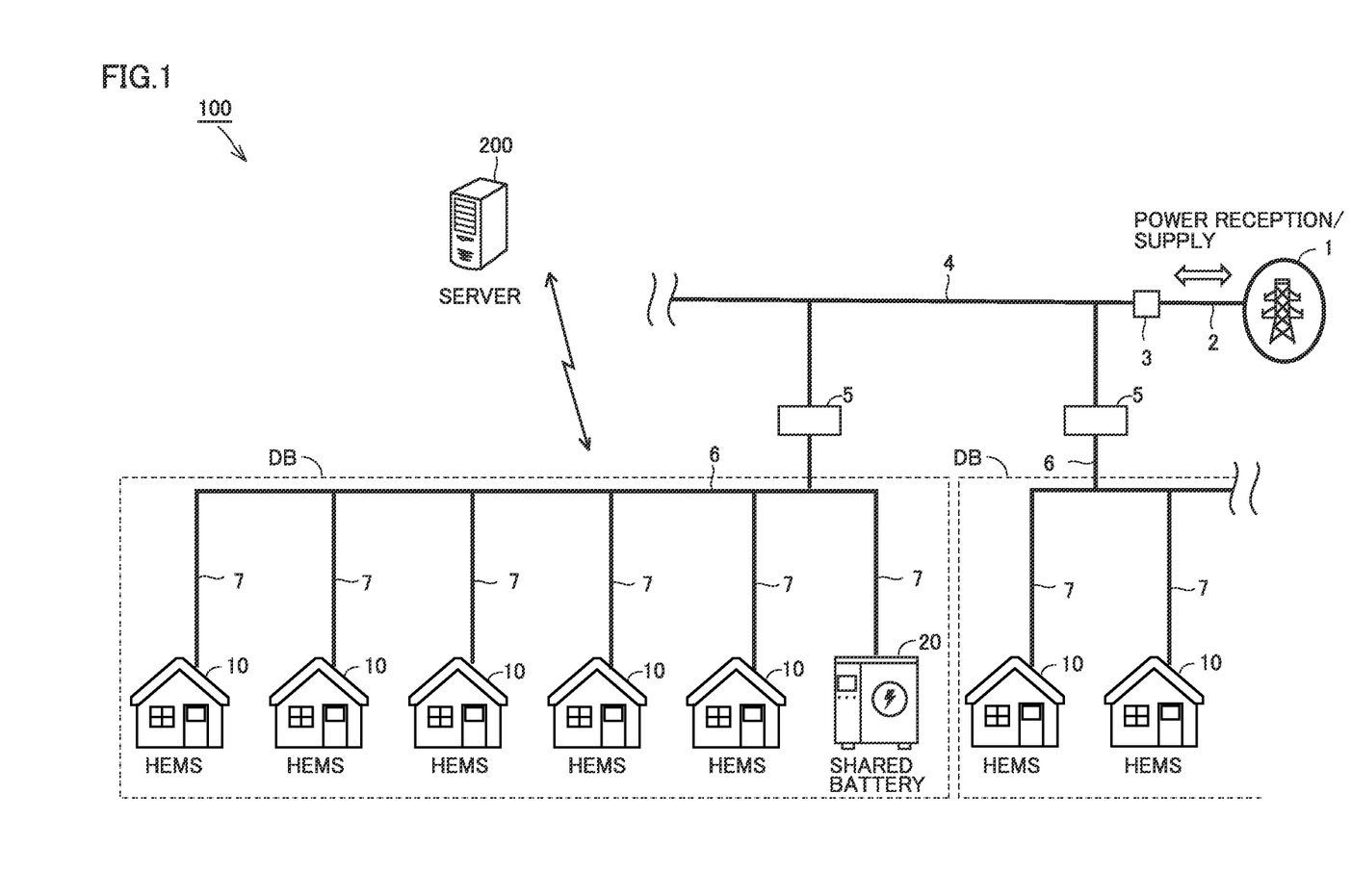
FIG. 1 is a diagram schematically showing an overall configuration of an electric power system according to the present embodiment.

FIG. 1 is a diagram schematically showing an overall configuration of an electric power system according to the present embodiment. As shown in FIG. 1, an electric power system 100 includes a power grid (power network) 1, a distribution substation 3, an electricity distribution transformer (pole-mounted transformer) 5, a house 10, a shared battery 20, and a server 200.

Power grid 1 is a power network composed of a power plant, a power transmission line, a high-voltage substation, and the like, and it is a power grid managed by an electricity retailer or the like. Electric power on a power transmission line 2 of power grid 1 is down-converted by distribution substation 3, for example, to a voltage of 6.6 kV and transmitted to an electricity distribution line 4. Electric power on electricity distribution line 4 is down-converted by electricity distribution transformer 5, for example, to single-phase three-wire 100V/200V and transmitted to an electricity distribution line 6. Electricity distribution transformer 5 may be, for example, a pole-mounted transformer of a capacity of 30 kVA.

Electricity distribution line 6 is connected to a plurality of houses 10 through a lead-in wire 7 for each house. Electric power transmitted from electricity distribution transformer 5 to electricity distribution line 6 is thus supplied to the plurality of houses 10. Shared battery 20 is connected to electricity distribution line 6 through lead-in wire 7. In the present embodiment, five houses 10 and single shared battery 20 are connected to power grid 1 with single electricity distribution transformer 5 being interposed. A low-voltage power network composed of houses 10 and shared battery 20 among which single electricity distribution transformer 5 is shared (connected to electricity distribution transformer 5) is referred to as an electricity distribution town block DB.

Figure 2:
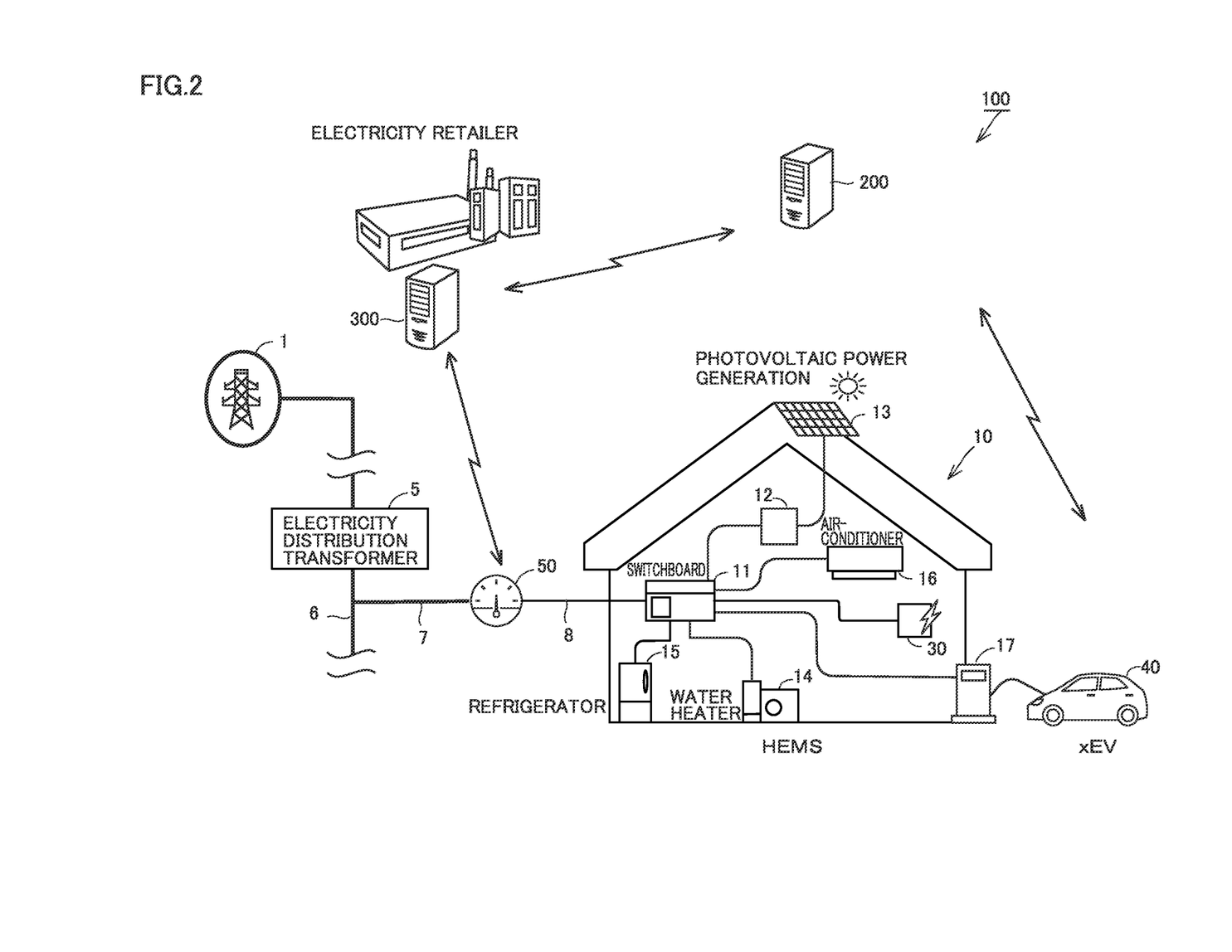
FIG. 2 is a diagram showing a general configuration of a house according to the present embodiment.

FIG. 2 is a diagram showing a general configuration of a house according to the present embodiment. Lead-in wire 7 connected to electricity distribution line 6 is connected to a customer-owned power line 8 with a smart meter 50 being interposed. Smart meter 50 is an electronic watt-hour meter with a communication function, and it measures an amount of electric power supplied and received between power grid 1 and house 10 during a prescribed measurement period (for example, thirty minutes) and transmits to a server 300 supervised by the electricity retailer, the measured amount of electric power together with an identification code (ID) of smart meter 50 every prescribed cycle (for example, every sixty minutes).

In house 10 connected to power grid 1 with smart meter 50 being interposed, for example, various electrical appliances such as a power conditioning system (PCS) 12 and a photovoltaic power generation apparatus 13, a heat-pump water heater 14, a refrigerator 15, an air-conditioner (heating and cooling apparatus) 16, and a charging and discharging facility 17 are connected through the customer-owned power line with a switchboard 11 adapted to home energy management service (HEMS) being interposed. Thus, electric power supplied from power grid 1 can be consumed, or electric power generated by photovoltaic power generation apparatus 13 or electric power discharged from an electrically powered vehicle 40 can be supplied to power grid 1 (reverse power flow). Each of such electrical appliances corresponds to the "electrical load" in the present disclosure.

Charging and discharging facility 17 is a vehicle to home (V2H) charging and discharging facility, and allows charging of a power storage of electrically powered vehicle 40 and reverse power flow of electric power discharged from electrically powered vehicle 40 to power grid 1.

Electrically powered vehicle 40 is a battery electric vehicle (BEV) on which a not-shown battery (power storage) is mounted. Any type of electrically powered vehicle that can be connected to charging and discharging facility 17 may be applicable, such as a plug-in hybrid electric vehicle (PHEV) or a plug-in fuel cell electric vehicle (FCEV).

A HEMS controller 30 is provided in house 10. HEMS controller 30 is configured to communicate with each electrical appliance such as switchboard 11, PCS 12, refrigerator 15, and heating and cooling apparatus 16 adapted to HEMS. HEMS controller 30 obtains information on each electrical appliance and controls operation of each electrical appliance.

HEMS controller 30 is configured to communicate with server 200. Server 200 controls electrical appliances (electrical loads provided in house 10) such as refrigerator 15 and cooling and heating apparatus 16 through HEMS controller 30. Server 200 includes a control device, a storage device, and a communication device that are not shown, and the control device is configured to perform prescribed computing processing. The storage device includes a memory where a program to be executed by the control device is stored, and various types of information (a map, a relational expression, a parameter, or the like) to be used in the program is stored in the memory. The storage device includes a database, and together with an identification code (ID) of HEMS controller 30 of each house 10, information on a location where the ID is located or data on each electrical appliance is stored in the database. The communication device includes a communication interface and is configured to communicate with HEMS controller 30, server 300, or the like.

In shared battery 20 (see FIG. 1), electric power generated by photovoltaic power generation apparatus 13 is temporarily stored, and shared battery 20 supplies stored electric power to each house 10.

Each electrical appliance provided in house 10 includes a capacitive load or an inductive load. For example, refrigerator 15 or heating and cooling apparatus 16 includes an electric compressor. When power is turned on to start up the electric compressor (electric motor), the inrush current or the rush current is produced. The inrush current or the rush current may be a high current ten or more times as high as a steady-state current. When the inrush current is simultaneously caused in the electrical appliances provided in houses 10 in electricity distribution town block DB, a high current corresponding to the sum of inrush currents caused in the electrical appliances in houses 10 flows through electricity distribution transformer 5 shared among houses 10 (connected to houses 10), which results in significant voltage lowering.

In order to allow flow of the high current corresponding to the sum of inrush currents caused in various electrical appliances in houses 10, electricity distribution transformer 5 large in allowable current value and electricity distribution line 6 large in allowable current value are required, which results in increase in cost for facilities. In addition, allowance of the high current corresponding to the sum of inrush currents caused in various electrical appliances in houses 10 results in significant voltage lowering, and influence on power grid 1 may be unignorable.

In the present embodiment, by arbitrating power-on timings of various electrical appliances in houses 10 in electricity distribution town block DB, simultaneous occurrence of the inrush current in the various electrical appliances provided in houses 10 is prevented. Thus, significant voltage lowering is suppressed and flow of a high current in electricity distribution transformer 5 and electricity distribution line 6 shared among houses 10 is suppressed.

In the present embodiment, HEMS controller 30 obtains information on each electrical appliance and controls operation of each electrical appliance. Each electrical appliance provided in house 10 transmits the fact of turn-on of power by a user (switch ON of the electrical appliance) to HEMS controller 30 as a power-on request (an ON request). At the time of power-on of a currently inactive device high in inrush current in an operating electrical appliance as well, the electrical appliance transmits the power-on request (ON request) to HEMS controller 30. For example, at the time of power-on of an inactive electric compressor (electric motor) while refrigerator 15 or cooling and heating apparatus 16 is operating, refrigerator 15 or cooling and heating apparatus 16 transmits the power-on request to HEMS controller 30.

When HEMS controller 30 receives the power-on request, it transmits to server 200, "information (a type, rated power consumption, or the like) on the electrical appliance that has transmitted the power-on request" and an "identification code (ID) of HEMS controller 30" as a power-on request signal. When server 200 simultaneously receives power-on request signals from a plurality of HEMS controllers 30 in electricity distribution town block DB, it arbitrates power-on timings of the electrical appliances and transmits the power-on permission command to HEMS controllers 30 such that power-on timings of the electrical appliances do not coincide (the electrical appliances are not simultaneously powered on). When the power-on request signal received from HEMS controller 30 does not coincide with the power-on timing of another electrical appliance (the electrical appliances are not simultaneously powered on), server 200 transmits the power-on permission command to HEMS controllers 30 (without arbitration). When HEMS controller 30 receives the power-on permission command from server 200, it controls the electrical appliance that has transmitted the power-on request to be powered on based on the power-on permission command. An electrical appliance where the inrush current at the time of turn-on of power (switch ON) is lower than a prescribed value and influence on power grid 1 by simultaneous occurrence of the inrush current is ignorable may transmit the power-on request (ON request) to HEMS controller 30 and may be powered on without receiving the power-on permission command.

Figure 3:
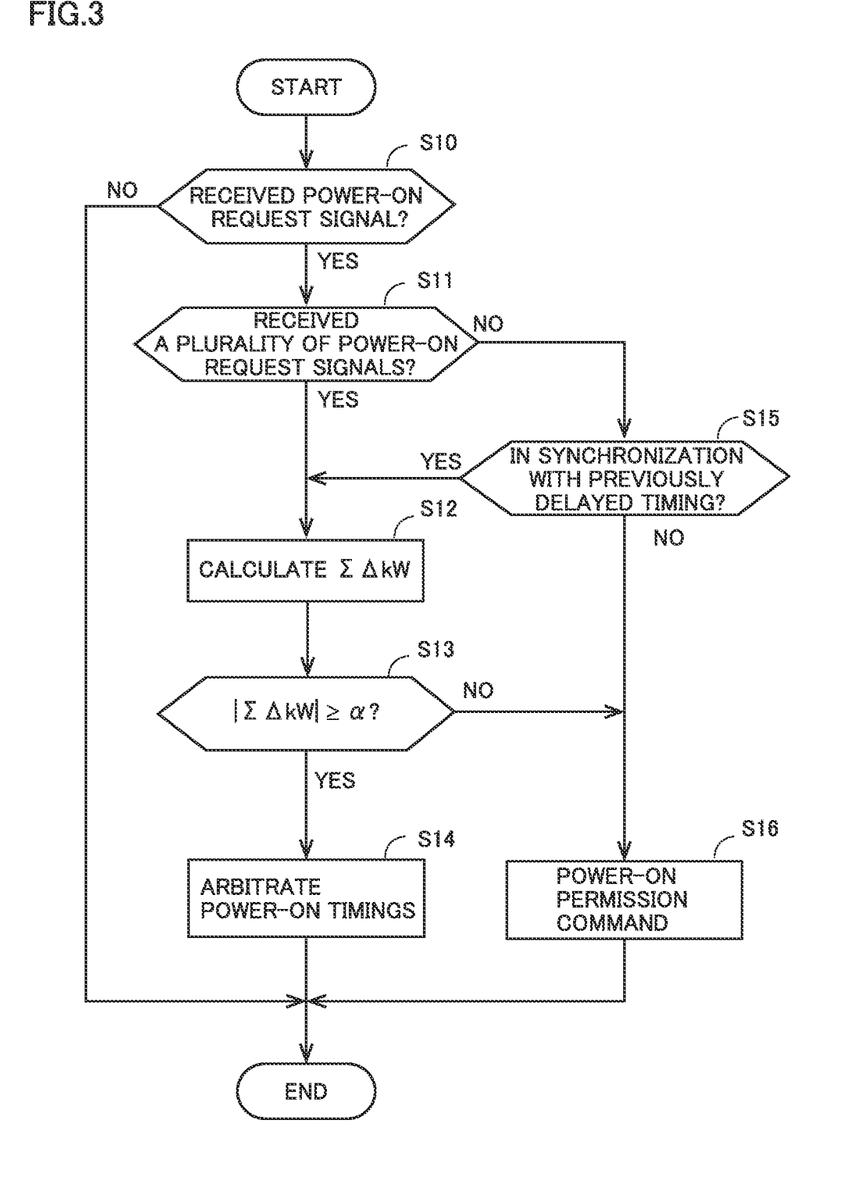
FIG. 3 is a flowchart showing exemplary processing performed in a server.

FIG. 3 is a flowchart showing exemplary processing performed in server 200. This flowchart is repeatedly processed every prescribed period in server 200. This processing is performed by server 200 for each electricity distribution town block DB. Initially, in step (the step being abbreviated as "S" below) 10, whether or not the server has received the power-on request signal from HEMS controller 30 is determined. When the server has not received the power-on request signal from HEMS controller 30, negative determination is made and the present routine ends.

When server 200 has received the power-on request signal from HEMS controller 30, affirmative determination is made and the process proceeds to S11. In S11, whether or not the server has received a plurality of power-on request signals is determined. When the server has received power-on request signals from a plurality of HEMS controllers 30, it is determined that there are a plurality of power-on request signals. When the server has received the power-on request signals from the plurality of HEMS controllers 30, affirmative determination is made in S11 and the process proceeds to S12.

In S12, server 200 calculates a total amount of electric power variation $\Sigma\Delta kW$. Server 200 calculates an amount of electric power variation $\Delta kW$ due to the inrush current in each electrical appliance based on the "information (a type, rated power consumption, or the like) on the electrical appliance that has transmitted the power-on request" and the "identification code (ID) of HEMS controller 30" included in the power-on request signal received in S10. For example, the server calculates magnitude of the inrush current based on the type and rated current consumption of the electrical appliance that has transmitted the power-on request. At this time, an environment where the electrical appliance is used may be estimated from the ID of HEMS controller 30 and magnitude of the inrush current may be calculated. For example, when the type of the electrical appliance falls under cooling and heating apparatus 16, information on a location is obtained based on the ID of HEMS controller 30 in addition to rated power consumption in cooling and heating apparatus 16, and magnitude of the inrush current may be calculated with an air temperature at that location being taken into account. Then, amount of electric power variation $\Delta kW$ due to the inrush current is calculated based on magnitude of the inrush current.

Server 200 calculates amount of electric power variation $\Delta kW$ due to the inrush current for each power-on request signal (for each ID of HEMS controller 30) received in S10, and calculates total amount of electric power variation $\Sigma\Delta kW$ by adding all calculated amounts of electric power variation $\Delta kW$.

In subsequent S13, whether or not magnitude (an absolute value) of total amount of electric power variation $\Sigma\Delta kW$ is equal to or larger than an allowable value $\alpha$ is determined. When magnitude of total amount of electric power variation $\Sigma\Delta kW$ is equal to or larger than allowable value $\alpha$ ($|\Sigma\Delta kW| \geq \alpha$), affirmative determination is made and the process proceeds to S14. Allowable value $\alpha$ may be set in advance, for example, based on a current value allowable in electricity distribution transformer 5 and electricity distribution line 6, or may be set based on an amount of voltage lowering allowable in power grid 1. When magnitude of total amount of electric power variation $\Delta\Sigma\Delta kW$ is smaller than allowable value $\alpha$ in S13 ($|\Sigma\Delta kW| < \alpha$), negative determination is made and the process proceeds to S16.

In S14, power-on timings are arbitrated between power-on request signals (between IDs of HEMS controllers 30) received in S10. Arbitration of power-on timings in the present disclosure refers to transmission of the power-on permission command shifted in power-on timing of the electrical appliances such that the electrical appliances are not simultaneously powered on. For example, the power-on permission command is transmitted to HEMS controller 30 such that the electrical appliance largest in amount of electric power variation $\Delta kW$ is immediately powered on. Then, after the electrical appliance largest in amount of electric power variation $\Delta kW$ is powered on, the power-on permission command is transmitted to corresponding HEMS controllers 30 such that the electrical appliances are powered on sequentially at several-second intervals in the order of magnitude of amount of electric power variation $\Delta kW$. Any method of arbitration of power-on timings is applicable. For example, the power-on permission command may be transmitted to HEMS controllers 30 such that the electrical appliances are powered on sequentially at several-second intervals in the ascending order of magnitude of the ID of HEMS controller 30, or the power-on permission command may be transmitted to HEMS controllers 30 such that the electrical appliances are powered on sequentially at several-second intervals in accordance with the priority based on the type of the electrical appliances.

HEMS controller 30 that has received the power-on permission command controls the electrical appliance that has transmitted the power-on request to be powered on based on the power-on permission command. The power-on permission command is composed, for example, of a "command to immediately power on the electrical appliance" and a "command to power on the electrical appliance after lapse of a prescribed time period (several seconds to ten or more seconds) after reception of the power-on permission command," and it is power-on permission commands shifted in power-on timing of the electrical appliances such that the electrical appliances are not simultaneously powered on. The power-on permission command may be such a command to indicate time of power-on of each electrical appliance so as to shift power-on timings of the electrical appliances such that the electrical appliances are not simultaneously powered on.

When a single power-on request signal has been received in S10, negative determination is made in S11 and the process proceeds to S15. In S15, whether or not the power-on timing of the electrical appliance delayed in arbitration of the power-on timing (power-on timing based on the power-on permission command) in S14 in the previous routine is in synchronization with the power-on timing of the electrical appliance indicated by the power-on request signal presently received in S10 is determined. When server 200 transmits the power-on permission command which is the "command to immediately power on the electrical appliance" in response to the power-on request signal presently received in S10 and when the power-on timing of the electrical appliance coincides with (power-on is simultaneous with) the power-on timing of the electrical appliance delayed in arbitration of the power-on timing (power-on timing based on the power-on permission command) in S14 in the previous routine, affirmative determination is made in S15 and the process proceeds to S12.

When the power-on timing was not arbitrated in S14 in the previous routine, negative determination is made in S15 and the process proceeds to S16. In spite of arbitration of the power-on timing in S14 in the previous routine, when the power-on permission command which is the "command to immediately power on the electrical appliance" is transmitted in response to the power-on request presently received in S10 and when the power-on timing of the electrical appliance does not coincide with the power-on timing of the electrical appliance delayed in arbitration of the power-on timing (power-on timing based on the power-on permission command) in S14 in the previous routine, negative determination is made in S15 and the process proceeds to S16.

In S12 subsequent to S15, total amount of electric power variation ΣΔkW is calculated by adding amount of electric power variation ΔkW due to the inrush current in the electrical appliance that has issued the power-on request signal presently received in S10 (which is also referred to as a present electrical appliance below) and amount of electric power variation ΔkW due to the inrush current in the electrical appliance synchronous in power-on timing with the present electrical appliance as a result of arbitration of the power-on timing in S14 in the previous routine, and the process proceeds to S13. Processing in S13 is as described above.

In S16, the "command to immediately power on the electrical appliance" is transmitted as the power-on permission command in response to the power-on request signal (HEMS controller 30) received in S10, and the present routine ends.

In the present embodiment, each electrical appliance (electrical load) provided in house 10 issues to HEMS controller 30, the power-on request to request power-on accompanied by the inrush current or the rush current equal to or larger than a prescribed value. Then, when each electrical appliance provided in house 10 receives from HEMS controller 30, the power-on permission command in response to the power-on request, it is powered on based on the power-on permission command. Then, when server 200 receives power-on request signals simultaneously from a plurality of HEMS controllers 30 in electricity distribution town block DB and when total amount of electric power variation ΔΣkW calculated by addition of amounts of electric power variation ΔkW due to the inrush current in the electrical appliances is equal to or larger than allowable value α, server 200 arbitrates power-on timings of the electrical appliances and transmits the power-on permission command to HEMS controllers 30 such that power-on timings of the electrical appliances do not coincide (the electrical appliances are not simultaneously powered on). Therefore, simultaneous occurrence of the inrush current in the electrical appliances provided in houses 10 in electricity distribution town block DB can be suppressed, significant voltage lowering can be suppressed, and influence on power grid 1 can be lessened. In addition, flow of a high current in electricity distribution transformer 5 and electricity distribution line 6 shared among houses 10 can be suppressed.

In the embodiment, whether or not magnitude of voltage lowering exceeds the allowable level is determined (S12 and S13) based on amount of electric power variation ΔkW due to the inrush current. Alternatively, whether or not magnitude of voltage lowering due to the inrush current exceeds the allowable level may be determined based on an amount of variation in frequency (ΔHz) involved with voltage lowering. Alternatively, whether or not magnitude of voltage lowering due to the inrush current exceeds the allowable level may be determined based on magnitude of voltage lowering.

In the embodiment, each electrical appliance in house 10 issues the power-on request to server 200 and receives the power-on permission command therefrom through HEMS controller 30 such that power-on timing thereof is arbitrated. Each electrical appliance in house 10 and server 200, however, may communicate with each other without HEMS controller 30 being interposed, such that the power-on timings of the electrical appliances are arbitrated.

In the embodiment, server 200 calculates amount of electric power variation ΔkW due to the inrush current in each electrical appliance based on the "information (the type, rated power consumption, or the like) on the electrical appliance that has transmitted the power-on request" and the "identification code (ID) of HEMS controller 30" included in the power-on request signal. The information on "amount of electric power variation ΔkW" in each electrical appliance may be included in the power-on request signal to be transmitted from HEMS controller 30 to server 200, and server 200 may calculate total amount of electric power variation ΣΔkW by adding received "amount of electric power variation ΔkW" in each electrical appliance.

MODIFICATION

As the electrical appliance in house 10 stops operating, electric power consumed in the electrical appliance becomes 0 and power consumption suddenly lowers. In electricity distribution town block DB, when electrical appliances in each house 10 simultaneously stop operating, an amount of lowering in power consumption increases. Sudden great lowering in power consumption results in instantaneous voltage increase in electricity distribution transformer 5 and electricity distribution line 6. Influence by this instantaneous voltage increase on electricity distribution transformer 5 and on power grid 1 may be unignorable. In a modification, instantaneous voltage increase in electricity distribution town block DB is suppressed by arbitration of turn-off timings of electrical appliances in addition to arbitration of power-on timings of the electrical appliances.

In the modification, each electrical appliance provided in house 10 transmits, in turn-off thereof, a turn-off request (an OFF request) to request turn-off to HEMS controller 30. At the time of turn-off of an active device high in power consumption in an operating electrical appliance as well, the electrical appliance transmits the turn-off request (OFF request) to HEMS controller 30. For example, at the time of turn-off of an active electric compressor (electric motor) while refrigerator 15 or cooling and heating apparatus 16 is operating, refrigerator 15 or cooling and heating apparatus 16 transmits the turn-off request to HEMS controller 30.

When HEMS controller 30 receives the turn-off request, it transmits to server 200, "information (a type, rated power consumption, or the like) on the electrical appliance that has transmitted the turn-off request" and an "identification code (ID) of HEMS controller 30" as the turn-off request signal. When server 200 simultaneously receives turn-off request signals from a plurality of HEMS controllers 30 in electricity distribution town block DB, it arbitrates turn-off timings of the electrical appliances and transmits the turn-off permission command to HEMS controllers 30 such that turn-off timings of the electrical appliances do not coincide (the electrical appliances do not simultaneously turn-off). When the turn-off request signal received from HEMS controller 30 does not coincide with turn-off timing of another electrical appliance (the electrical appliances do not simultaneously turn off), server 200 transmits the turn-off permission command to HEMS controllers 30 (without arbitration). When HEMS controller 30 receives the turn-off permission command from server 200, it controls the electrical appliance that has transmitted the turn-off request to turn off based on the turn-off permission command. An electrical appliance low in power consumption, where influence on power grid 1 by simultaneous turn-off is ignorable, may stop operating without transmission of the turn-off request (OFF request) to HEMS controller 30.

Figure 4:
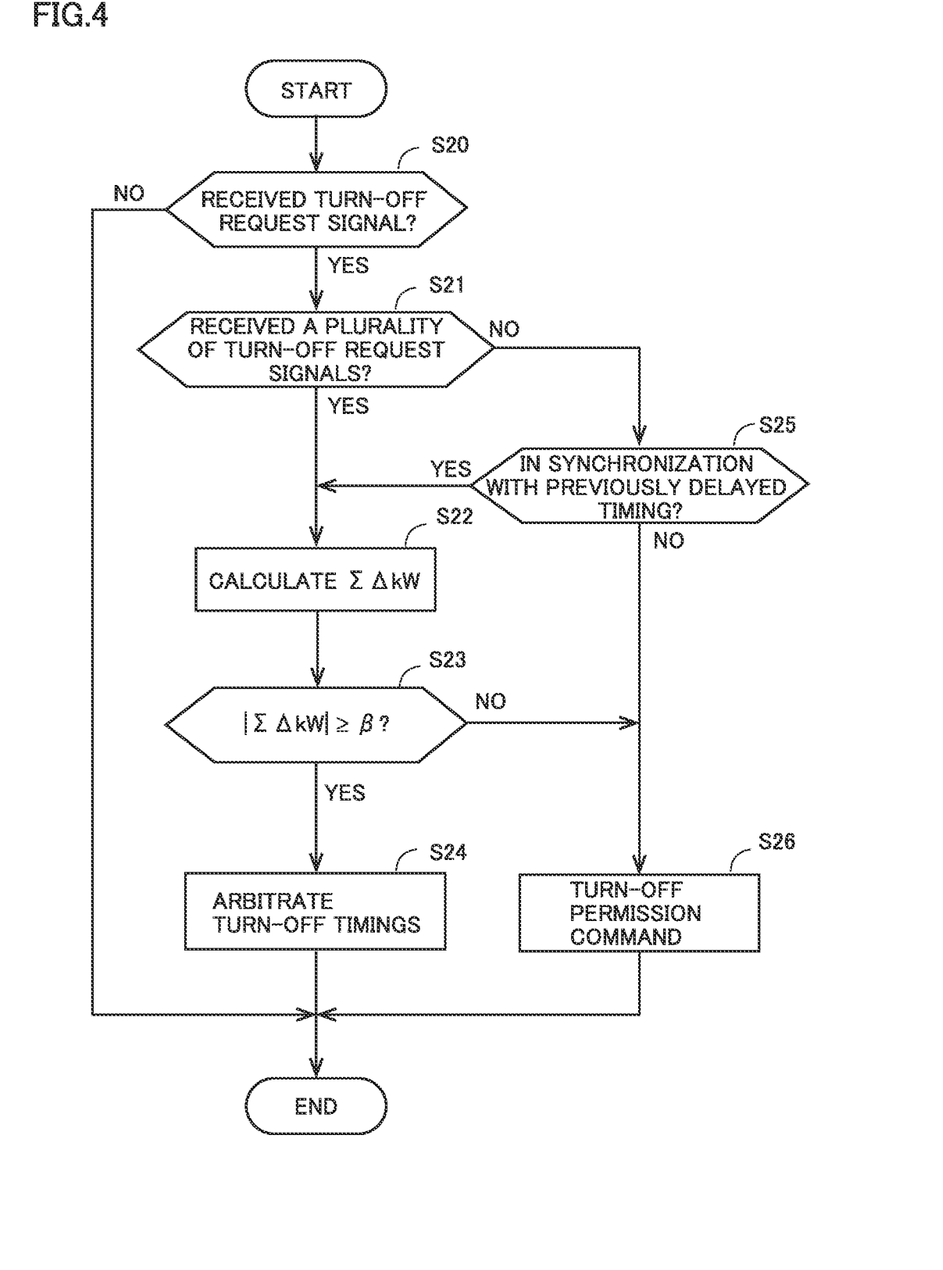
FIG. 4 is a flowchart showing exemplary processing performed in the server in a modification.

FIG. 4 is a flowchart showing exemplary processing performed in server 200 in the modification. This flowchart is repeatedly processed every prescribed period in server 200. This processing is performed by server 200 in addition to the procedure in the flowchart in FIG. 3 for each electricity distribution town block DB.

In FIG. 4, S20 to S26 are substantially the same as the processing in S10 to S16 in FIG. 3, with a signal received from HEMS controller 30 by server 200 being replaced from the power-on request signal (FIG. 3) to the turn-off request signal (FIG. 4). In S20, whether or not the server has received the turn-off request signal from HEMS controller 30 is determined. When the server has not received the turn-off request signal, negative determination is made and the present routine ends.

When the server has received the turn-off request signal, affirmative determination is made and the process proceeds to S21. Whether or not the server has received a plurality of turn-off request signals is determined. When the server has received the turn-off request signals from a plurality of HEMS controllers 30, it is determined that there are a plurality of turn-off request signals (affirmative determination is made) and the process proceeds to S22.

In S22, server 200 calculates total amount of electric power variation $\Sigma\Delta kW$. Server 200 calculates amount of electric power variation $\Delta kW$ in turn-off of the electrical appliance based on the "information (the type, rated power consumption, or the like) on the electrical appliance that has transmitted the turn-off request" and the "identification code (ID) of HEMS controller 30" included in the turn-off request signal received in S20. For example, the server calculates amount of electric power variation $\Delta kW$ in turn-off of the electrical appliance based on the type and rated current consumption of the electrical appliance that has transmitted the turn-off request. Server 200 calculates amount of electric power variation $\Delta kW$ in deactivation for each turn-off request signal (for each ID of HEMS controller 30) received in S20, and calculates total amount of electric power variation $\Delta\Sigma kW$ by adding all calculated amounts of electric power variation $\Delta kW$.

In subsequent S23, whether or not magnitude (absolute value) of total amount of electric power variation $\Sigma\Delta kW$ is equal to or larger than a threshold value $\beta$ is determined. When magnitude of total amount of electric power variation $\Sigma\Delta kW$ is equal to or larger than threshold value $\beta$ ($|\Sigma\Delta kW|\geq\beta$), affirmative determination is made and the process proceeds to S24. Threshold value $\beta$ is set, for example, based on an amount of voltage increase allowable in power grid 1. When magnitude of total amount of electric power variation $\Delta\Sigma\Delta kW$ is smaller than threshold value $\beta$ in S23 ($|\Sigma\Delta kW|<\beta$), negative determination is made and the process proceeds to S26.

In S24, turn-off timings are arbitrated between the turn-off request signals (between the IDs of HEMS controllers 30) received in S20. Arbitration of turn-off timings in the present disclosure refers to transmission of the turn-off permission command shifted in turn-off timing of the electrical appliances such that the electrical appliances are not simultaneously turned off. For example, the turn-off permission command is transmitted to HEMS controller 30 such that the electrical appliance largest in amount of electric power variation $\Delta kW$ is immediately turned off. Then, after the electrical appliance largest in amount of electric power variation $\Delta kW$ is turned off, the turn-off permission command is transmitted to corresponding HEMS controllers 30 such that the electrical appliances are sequentially turned off at several-second intervals in the order of magnitude of amount of electric power variation $\Delta kW$. Any method of arbitration of turn-off timings is applicable. For example, the turn-off permission command may be transmitted to HEMS controllers 30 such that the electrical appliances are turned off sequentially at several-second intervals in the ascending order of magnitude of the ID of HEMS controller 30, or the turn-off permission command may be transmitted to HEMS controllers 30 such that the electrical appliances are turned off sequentially at several-second intervals in accordance with the priority based on the type of the electrical appliances.

HEMS controller 30 that has received the turn-off permission command controls the electrical appliance that has transmitted the turn-off request to be turned off based on the turn-off permission command. The turn-off permission command is composed, for example, of a "command to immediately turn-off the electrical appliance" and a "command to turn-off the electrical appliance after lapse of a prescribed time period (several seconds to ten or more seconds) after reception of the turn-off permission command," and it refers to turn-off permission commands shifted in turn-off timing of the electrical appliances such that the electrical appliances are not simultaneously turned off. The turn-off permission command may be such a command to indicate time of turn-off of each electrical appliance and to shift turn-off timings of the electrical appliances such that the electrical appliances are not simultaneously turned off.

When single turn-off request signal has been received in S20, negative determination is made in S21 and the process proceeds to S25. In S25, whether or not the turn-off timing of the electrical appliance delayed in arbitration of the turn-off timing (turn-off timing based on the turn-off permission command) in S24 in the previous routine is in synchronization with the turn-off timing of the electrical appliance indicated by the turn-off request signal presently received in S20 is determined. When server 200 transmits the turn-off permission command which is the "command to immediately turn-off the electrical appliance" in response to the turn-off request signal presently received in S20 and when the turn-off timing of the electrical appliance coincides with (turn-off is simultaneous with) the turn-off timing of the electrical appliance delayed in arbitration of the turn-off timing (turn-off timing based on the turn-off permission command) in S24 in the previous routine, affirmative determination is made in S25 and the process proceeds to S22.

When the turn-off timing was not arbitrated in S24 in the previous routine, negative determination is made in S25 and the process proceeds to S26. In spite of arbitration of the turn-off timing in S24 in the previous routine, when the turn-off permission command which is the "command to immediately turn-off the electrical appliance" is transmitted in response to the turn-off request presently received in S20 and when the turn-off timing of the electrical appliance does not coincide with the turn-off timing of the electrical appliance delayed in arbitration of the turn-off timing (turn-off timing based on the turn-off permission command) in S24 in the previous routine, negative determination is made in S25 and the process proceeds to S26.

In S22 subsequent to S25, total amount of electric power variation ΣΔkW is calculated by adding amount of electric power variation ΔkW in the electrical appliance that has issued the turn-off request signal presently received in S20 (which is also referred to as a present electrical appliance below) and amount of electric power variation ΔkW in the electrical appliance synchronous in turn-off timing with the present electrical appliance as a result of arbitration of the turn-off timing in S24 in the previous routine, and the process proceeds to S23. Processing in S23 is as described above.

In S26, the "command to immediately turn-off the electrical appliance" is transmitted as the turn-off permission command in response to the turn-off request signal (HEMS controller 30) received in S20, and the present routine ends.

According to this modification, simultaneous occurrence of the inrush current in the electrical appliances provided in houses 10 in electricity distribution town block DB can be suppressed, significant voltage lowering can be suppressed, and instantaneous voltage increase due to simultaneous turn-off of the electrical appliances provided in houses 10 can be prevented.

Though an embodiment of the present disclosure has been described above, it should be understood that the embodiment disclosed herein is illustrative and non-restrictive in every respect. The technical scope shown in the present disclosure is defined by the terms of the claims and is intended to include any modifications within the scope and meaning equivalent to the terms of the claims.

What is claimed is:

1. An electric power system comprising:
    a plurality of houses connected to an electricity distribution transformer that transforms electric power from a power grid,
        each of the plurality of houses including an electrical load accompanied by an inrush current or a rush current equal to or larger than a prescribed value in power-on; and
    a server that receives information on the electrical load, wherein
    the electrical load is configured to issue a power-on request to request power-on of the electrical load and to be powered on based on a power-on permission command in response to the power-on request, and
    the server is configured to arbitrate power-on timings of electrical loads included in the plurality of houses and to transmit the power-on permission command when the server simultaneously receives power-on requests from the electrical loads and when a parameter relating to voltage lowering due to the inrush current or the rush current is equal to or larger than an allowable value.

2. The electric power system according to claim 1, wherein
    the parameter relating to voltage lowering is an amount of electric power variation caused by the inrush current or the rush current, and
    the server is configured to
        find the amount of electric power variation for each of the electrical loads,
        calculate a total amount of electric power variation by adding amounts of electric power variation of the electrical loads that have simultaneously issued the power-on requests, and
        arbitrate power-on timings of the electrical loads and transmit the power-on permission command when the total amount of electric power variation is equal to or larger than the allowable value.

3. The electric power system according to claim 1, wherein
    each of the plurality of houses includes a controller that controls the electrical loads provided in that house,
    the controller is configured to communicate with the server, and
    the controller transmits the power-on request to the server and has the electrical load powered on based on the power-on permission command received from the server.

4. The electric power system according to claim 1, wherein
    the electrical load is configured to issue a turn-off request to request deactivation of the electrical load and to be deactivated based on a turn-off permission command in response to the turn-off request, and
    the server is configured to arbitrate turn-off timings of the electrical loads included in the plurality of houses and to transmit the turn-off permission command when the server simultaneously receives turn-off requests from the electrical loads and when a parameter relating to voltage increase involved with the deactivation is equal to or larger than a threshold value.

5. The electric power system according to claim 4, wherein
    the parameter relating to voltage increase is an amount of electric power variation caused by the deactivation, and
    the server is configured to
        find the amount of electric power variation for each of the electrical loads,
        calculate a total amount of electric power variation by adding amounts of electric power variation of the electrical loads that have simultaneously issued the turn-off requests, and
        arbitrate turn-off timings of the electrical loads and transmit the turn-off permission command when the total amount of electric power variation is equal to or larger than the threshold value.

6. The electric power system according to claim 4, wherein
    each of the plurality of houses includes a controller that controls the electrical loads provided in that house,
    the controller is configured to communicate with the server, and
    the controller transmits the turn-off request to the server and has the electrical load deactivated based on the turn-off permission command received from the server.

* * * * *